Aug. 10, 1954  L. S. KASSEL  2,685,941
METHOD FOR CONCENTRATING HYDROGEN
Filed Jan. 31, 1951
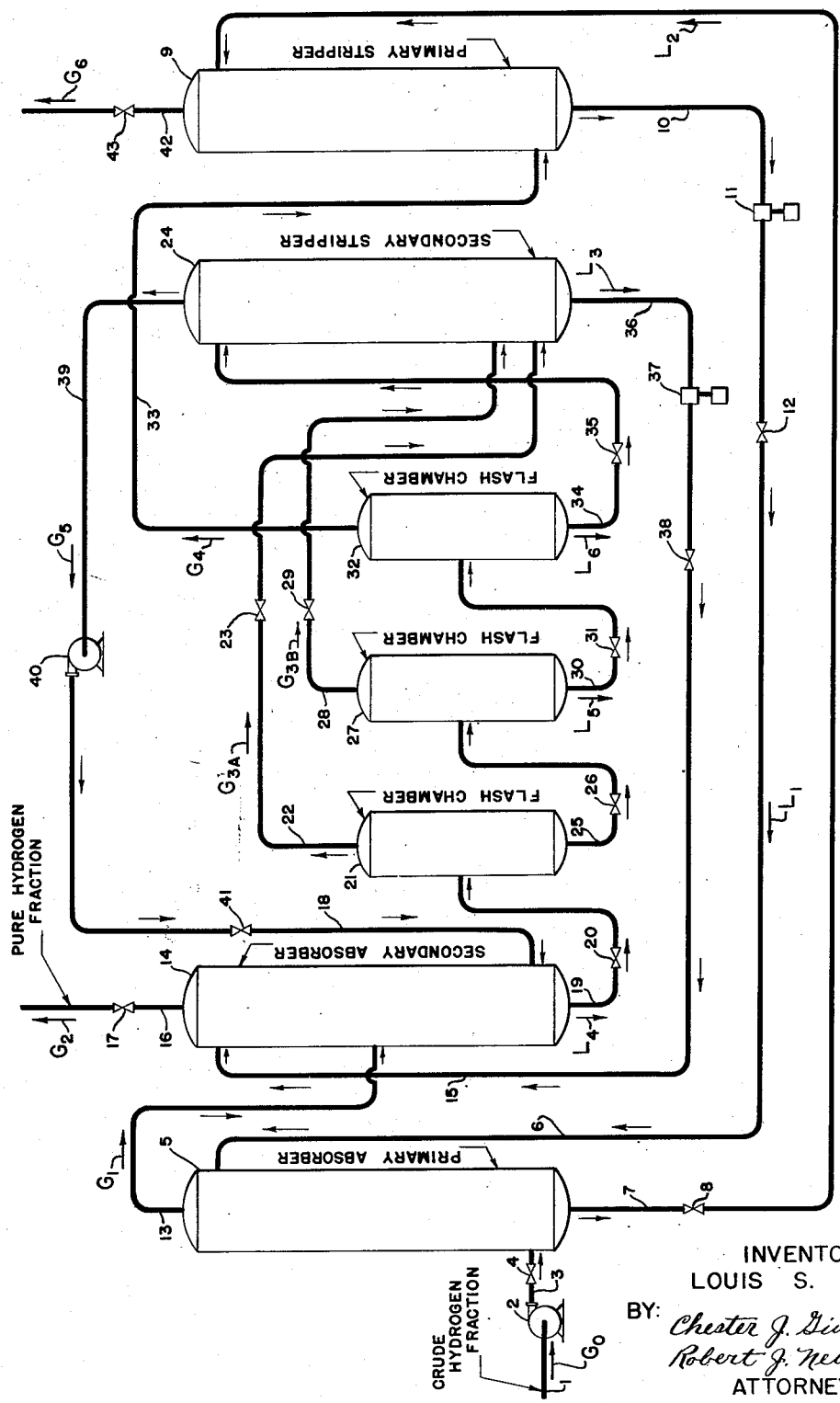
INVENTOR:
LOUIS S. KASSEL
BY: Chester J. Giuliani,
Robert J. Newman
ATTORNEYS:

Patented Aug. 10, 1954

2,685,941

UNITED STATES PATENT OFFICE 2,685,941

METHOD FOR CONCENTRATING HYDROGEN

Louis S. Kassel, Oak Park, Ill., assignor to Universal Oil Products Company, Chicago, Ill., a corporation of Delaware Application January 31, 1951, Serial No. 208,731

10 Claims. (Cl. 183—115)

This invention relates to the separation of gases. It is more particularly concerned with a process for producing purified hydrogen from mixtures comprising hydrogen and low molecular weight hydrocarbons.

Hydrogen-containing gases are produced in a number of processes such as hydrocarbon dehydrogenation, reforming and aromatizing processes, including particularly the "Platforming Process," in which straight run gasolines and the like are reformed or aromatized in the presence of hydrogen and a platinum-alumina-combined halogen catalyst. The concentration of hydrogen in these gases usually is too low to permit their use directly in processes such as the synthesis of ammonia and the hydrogenation of edible fats and oils. I have invented a process for producing purified hydrogen from these, and other, hydrogen-containing gases.

It is an object of this invention to provide a process for separating gases.

It is another object of this invention to produce high purity hydrogen from gaseous fractions containing hydrogen and low molecular weight hydrocarbons.

A further object of this invention is to produce high purity hydrogen from gaseous fractions containing hydrogen and low molecular weight hydrocarbons by a process involving substantially no heating or cooling.

In one embodiment my invention relates to a method for concentrating hydrogen which comprises contacting a gaseous charge containing hydrogen and low molecular weight hydrocarbons with a liquid absorbent under superatmospheric pressure, recovering from the contacting step rich absorbent and a gaseous stream having a higher hydrogen content than said gaseous charge, flash vaporizing the rich absorbent in a high pressure zone to separate therefrom a gaseous fraction rich in hydrogen and returning said gaseous fraction to the contacting step, flash vaporizing the remaining absorbent in a low pressure zone to remove additional hydrogen and light hydrocarbons, stripping the resulting absorbent, and returning the same to the contacting step.

In a more specific embodiment my invention relates to a method for concentrating hydrogen which comprises contacting a gaseous charge containing hydrogen and low molecular weight hydrocarbons with a first liquid hydrocarbon absorbent under a pressure of from about 1000 to about 5000 pounds in a primary absorber, passing gas from the primary absorber into a secondary absorber at an intermediate point thereof, introducing recycle gas, prepared as hereinafter described, near the bottom thereof and a second liquid hydrocarbon absorbent near the top thereof, removing overhead from said secondary absorber a gas richer in hydrogen than said gaseous charge, flash vaporizing the rich second absorbent in a high pressure zone to separate therefrom a recycle gas rich in hydrogen, flash vaporizing the remaining second absorbent in a low pressure zone to remove additional hydrogen and light hydrocarbons, stripping the resultant absorbent with said recycle gas in a secondary stripper and returning the stripped absorbent and the recycle gas to said secondary absorber, withdrawing rich first absorbent from the primary absorber, stripping said rich first absorbent with gas from said low pressure zone in a primary stripper, and returning the stripped absorbent to the primary absorber.

In addition to the absorber or absorbers employed in my process, the principal parts of my process are the stripping sections and the fractionation sections. The strippers must be designed so that they will remove sufficient absorbed material to produce an absorbent clean enough, i. e., lean enough, to do the absorption that is desired. Fractionation is necessary, since all of the components normally present in the gaseous charge to my process are absorbable. Hence the fractionation step must be introduced in order to obtain a pure hydrogen stream. Normally one would strip and fractionate by reboiling, i. e., by applying heat to the rich absorbent. However, this is an impractical solution in this case, since large volumes of absorbent are necessarily cycled through my system because of the relatively low solubilities of the gaseous components therein. Since the solubility of these components in the absorbent changes very little with temperature, the heating and cooling load would be ruinous from an economic viewpoint. Hence, I employ gas stripping rather than temperature stripping and, more than this, I strip in stages.

The gaseous fractions charged to my process comprise mixtures of hydrogen and low molecular weight hydrocarbons. These fractions predominate in hydrogen, i. e., contain more than about 50% hydrogen on a molal basis, and preferably contain between about 65 and 95% hydrogen. A preferred source of fractions of this type comprises the vent gas from reforming or aromatizing processes employing a catalyst comprising platinum-alumina-combined halogen, such as is described in U. S. Patent No. 2,479,110, issued August 16, 1949. The hydrogen content of these gases ordinarily lies within the range of from about 65 to about 95%. The bulk of the remaining material is methane with smaller amounts of ethane, propane, butane and pentane.

I prefer to use relatively narrow boiling hydrocarbon fractions having average molecular weights of about 150 as the liquid absorbents in my process. Hydrocarbon fractions that are substantially lighter than this are too volatile, i. e., some of the absorbent appears in the hydrogen fraction. On the other hand, if the absorbent is too heavy, larger quantities have to be used to obtain a given degree of absorption.

Further features and advantages of my process will be apparent from the description of the attached flow diagram shown in the figure, which illustrates a preferred method of conducting the process of this invention.

A crude hydrogen fraction comprising 93.0% hydrogen, 2.5% methane, 2.0% ethane, 1.3% propane, 0.8% butane and 0.4% pentane, is passed through line 1, is picked up by compressor 2, is discharged into line 3, containing valve 4, and is passed into primary absorber 5 near the bottom thereof. The gas passes upwardly and countercurrently to absorption oil which enters primary absorber 5 near the top thereof through line 6. Intimate contacting is effected by suitable packing or the like. In the primary absorber substantially all of the butane and pentane and a substantial amount of the propane are removed from the gaseous fraction. Rich oil from the primary absorber is withdrawn through line 7 containing valve 8 and is introduced into primary stripper 9 near the top thereof, wherein it is stripped in the manner subsequently described, and returned to primary absorber 5 through line 10 containing pump 11 and valve 12.

Gas from primary absorber 5 is withdrawn through line 13 and is passed into secondary absorber 14 at an intermediate point thereof. A stream of recycle gas containing hydrogen, and prepared as hereinafter described, enters secondary absorber 14 near the bottom thereof through line 18. Absorption oil enters secondary absorber 14 through line 15 at a rate such that substantially all of the remaining hydrocarbons are absorbed. Purified hydrogen is withdrawn from secondary absorber 14 through line 16 containing valve 17.

Rich absorber oil withdrawn from the bottom of secondary absorber 14 through line 19 containing valve 20 is flash vaporized in a high pressure zone followed by flash vaporization in a low pressure zone. Both the high pressure and low pressure flash vaporization zones may comprise one or a plurality of flash chambers. In this particular illustration, the high pressure zone comprises two flash chambers and the low pressure zone comprises one flash chamber. The distinguishing feature between the two zones, in addition to the different pressure levels, is that the gas from the high pressure flash vaporization zone is charged to the secondary stripper, whereas the gas from the low pressure flash vaporization zone is charged to the primary stripper. Stated more broadly, the gas from the high pressure zone ultimately is returned to the secondary absorber; whereas the gas from the low pressure zone ultimately is withdrawn or vented from the system.

The rich oil passing through line 19 is introduced into flash chamber 21, in which is separated a gas comprising a major proportion of hydrogen and a minor proportion of the absorbed hydrocarbons. This gas is withdrawn through line 22 containing valve 23 and is passed into the lower section of secondary stripper 24. Absorption oil is withdrawn from flash chamber 21 through line 25 containing valve 26 and is introduced into flash chamber 27. A gas rich in hydrogen and low in hydrocarbons is withdrawn from flash chamber 27 through line 28 containing valve 29 and is introduced into secondary stripper 24 near the bottom thereof. Absorption oil is withdrawn from flash chamber 27 through line 30 containing valve 31 and is introduced into flash chamber 32. The major part of the residual hydrogen and methane are removed overhead from flash chamber 32 through line 33 and are introduced into primary stripper 9 near the bottom thereof. The liquid from flash chamber 32 is withdrawn through line 34 containing valve 35 and is introduced into secondary stripper 24 near the top thereof, wherein it is stripped by gas from the high pressure flash chambers. Secondary stripper 24 is not heated; stripping action being obtained solely by partial pressure effect. Lean absorbent is withdrawn from secondary stripper 24 through line 36, containing pump 37 and valve 38, and is returned to the top of secondary absorber 14. Gas is withdrawn from the top of secondary stripper 24 through line 39, is recompressed by compressor 40, and passed into secondary absorber 14 via line 18 containing valve 41. The purpose of this gaseous recycle stream is to return hydrogen that has been separated from the rich second absorbent to the secondary absorber. The incidental return of hydrocarbons is not desired, but does no practical harm, since the returned hydrocarbons are substantially completely reabsorbed in the lower section of absorber 14.

Gas from the low pressure flash vaporization zone, i. e., flash chamber 32, strips rich primary absorbent in primary stripper 9. Gas from primary stripper 9 is withdrawn via line 42 containing valve 43. This is the only other product of the process, in addition to the pure hydrogen fraction withdrawn from the top of the secondary absorber 14.

The foregoing illustrates a preferred embodiment of my invention wherein the absorption, fractionating, and stripping steps function in an interdependent and cooperative manner with resultant economy in the preparation of a substantially pure hydrogen fraction. However, it is possible to operate my process with substantially the same results, although at higher costs, with less interdependence of the steps. For example, the gas from the high pressure flash vaporization zone can be returned directly to the secondary absorber instead of first being used to strip secondary absorbent in the secondary stripper. In that case, an external gas or other stripping medium can be used in the secondary stripper. Similarly, the gas from the low pressure flash vaporization zone can be vented or otherwise disposed of without first being used as a stripping medium in the primary stripper. In such an event, an extraneous stripping medium must be used.

If the original crude hydrogen gas contains no significant amount of hydrocarbons heavier than propane, the primary absorber and stripper may be omitted and a pure hydrogen fraction obtained without said absorber and stripper.

For some uses, it is necessary that the hydrogen employed be as pure as possible. For example, in the manufacture of ammonia, a minor amount of hydrogen is reacted with air as a means of adding nitrogen to the synthesis gas. This hydrogen should be as pure as possible in order to minimize formation of carbon oxides. I can prepare a hydrogen fraction of extremely high purity by slightly modifying the process that I have described. In such a case I remove the main stream of purified hydrogen as a side cut from a point near the top of the secondary absorber but below the point of entry of the lean absorbent. I then remove a minor stream of hydrogen as the overhead fraction. This overhead product thus receives an extra treatment with a very high absorption oil rate, giving almost complete absorption of all hydrocarbon components.

The following example is given to further illustrate my invention, but it is not given to unduly limit the generally broad scope of the same.

EXAMPLE

A crude hydrogen-hydrocarbon fraction was processed in the manner shown in the figure to produce a purified hydrocarbon fraction. The operating conditions and results are shown in the following table. The gas streams have been designated by the letter G with an appropriate subscript and the liquid streams have been designated by the letter L and a subscript. The flows of these streams are shown on the figure.

*Table*

OPERATING CONDITIONS

| Vessel | Temperature, °F. | Pressure p. s. i. a. |
|---|---|---|
| Primary Absorber 5 | 100 | 2,000 |
| Secondary Absorber 14 | 100 | 2,000 |
| Flash Chamber 21 | 100 | 1,200 |
| Flash Chamber 27 | 100 | 500 |
| Flash Chamber 32 | 100 | 20 |
| Secondary Stripper 24 | 100 | 20 |
| Primary Stripper 9 | 100 | 20 |

ABSORPTION OIL RATES

| Circuit | Primary Absorber 5—Primary Stripper 9—Primary Absorber 5: 0.1 mol oil/mol $G_0$. |
|---|---|
| Circuit | Secondary Absorber 14—Flash Chamber 21—Flash Chamber 27—Flash Chamber 32—Secondary Stripper 24—Secondary Absorber 14: 2.5 mol oil/mol $G_0$. |

VESSEL DESIGN

| Vessel | |
|---|---|
| Primary Absorber 5 | 7 theoretical plates. $G_0$ to plate 1. $L_1$ to plate 7. |
| Secondary Absorber 14 | 9 theoretical plates. $G_5$ to plate 1. $G_1$ to plate 3. $L_4$ to plate 9. |
| Primary Stripper 9 | 6 theoretical plates. $G_4$ to plate 1. $L_2$ to plate 6. |
| Secondary Stripper 24 | 7 theoretical plates. $G_{3A}$ to plate 1. $G_{3B}$ to plate 3. $L_6$ to plate 7. |

MOLAR RATES OF STREAMS
[Basis: $G_0$=100.]

| Stream | Absorption Oil | $H_2$ | $C_1$ | $C_2$ | $C_3$ | $C_4$ | $C_5$ | Percent of $G_0$ |
|---|---|---|---|---|---|---|---|---|
| $G_0$ | | 93.00 | 2.50 | 2.000 | 1.300 | .800 | .400 | 100.000 |
| $G_1$ | | 91.76 | 2.33 | 1.355 | .172 | .001 | .012 | |
| $G_2$ | | 85.79 | .18 | .009 | .053 | .001 | .001 | 86.034 |
| $G_{3A}$ | | 10.08 | .40 | .067 | .004 | .000 | .000 | |
| $G_{3B}$ | | 8.67 | .63 | .133 | .009 | .000 | .001 | |
| $G_4$ | | 5.97 | 2.15 | 1.346 | .119 | .000 | .011 | |
| $G_5$ | | 18.62 | 1.36 | 1.347 | .283 | .011 | .023 | |
| $G_6$ | | 7.21 | 2.32 | 1.991 | 1.247 | .799 | .399 | 13.966 |
| $L_1$ | 10.0 | .01 | .02 | .049 | .017 | .004 | .114 | |
| $L_2$ | 10.0 | 1.25 | .19 | .694 | 1.145 | .803 | .502 | |
| $L_3$ | 250 | .35 | .06 | .071 | .141 | .056 | .316 | |
| $L_4$ | 250 | 24.94 | 3.57 | 2.764 | .543 | .067 | .350 | |
| $L_5$ | 250 | 6.19 | 2.54 | 2.564 | .530 | .067 | .349 | |
| $L_6$ | 250 | .22 | .39 | 1.218 | .411 | .067 | .338 | |

COMPOSITION OF STREAMS, MOL PERCENT

| Stream | $H_2$ | $C_1$ | $C_2$ | $C_3$ | $C_4$ | $C_5$ |
|---|---|---|---|---|---|---|
| $G_0$ | 93.00 | 2.50 | 2.000 | 1.300 | .800 | .400 |
| $G_2$ | 99.71 | .21 | .010 | .062 | .001 | .001 |
| $G_6$ | 51.63 | 16.61 | 14.26 | 8.93 | 5.72 | 2.86 |

From the foregoing data it can be seen that the purified gas stream ($G_2$) has a hydrogen content of 99.71 mol per cent and that the volume of said stream is approximately 86% of the volume of the charge stream ($G_0$). The vent gas stream ($G_6$) has a hydrogen content of 51.6% and represents only about 14% of the gaseous charge stream.

The absorbers should be operated at relatively high pressures, usually within the range of from about 1000 p. s. i. a. to about 5000 p. s. i. a. The ratios of the pressures in the flash chambers and strippers to the absorber pressure usually will be approximately the same as those shown in the foregoing example.

The ratio of the rate of circulation of the second absorbent to the rate of circulation of the first absorbent should be large, i. e., substantially greater than about 10, and preferably about 25. If this ratio is not large enough, then the ratio of $G_4$ to $L_2$ will not be large enough to adequately strip $L_2$. As a consequence, relatively heavy hydrocarbon components will get into the secondary absorber and eventually appear in $G_2$, since the secondary stripper cannot effectively handle appreciable quantities of heavy components.

I claim as my invention:

1. A method for concentrating hydrogen which comprises contacting a gaseous charge containing hydrogen and low molecular weight hydrocarbons with a liquid hydrocarbon absorbent under a pressure of from about 1000 to about 5000 pounds per square inch, recovering from the contacting step rich absorbent and a gaseous stream having a higher hydrogen content than said gaseous charge, flash vaporizing the rich absorbent in a high pressure zone to separate therefrom a gaseous fraction rich in hydrogen, flash vaporizing the remaining absorbent in a low pressure zone to remove additional hydrogen and light hydrocarbons, stripping the resultant absorbent with the gaseous fraction produced in said high pressure zone and returning the stripped absorbent and the effluent gas from said stripping step to the contacting step.

2. The process of claim 1 further characterized in that said contacting is conducted in a countercurrent absorber in which the liquid absorbent enters near the top thereof, the gaseous charge enters at an intermediate point, the effluent gas from the stripping step enters near the bottom, and the gaseous stream having a higher hydrogen content than said gaseous charge is withdrawn at a point above the absorbent entry.

3. A method for concentrating hydrogen which comprises contacting a gaseous charge containing hydrogen and low molecular weight hydrocarbons with a first liquid hydrocarbon absorbent under superatmospheric pressure in a primary absorber, passing gas from the primary absorber into a secondary absorber at an intermediate point thereof, introducing recycle gas, prepared as hereinafter described, near the bottom thereof and a second liquid hydrocarbon absorbent at the top thereof, removing overhead from said secondary absorber a gas richer in hydrogen than said gaseous charge, flash vaporizing the rich second absorbent in a high pressure zone to separate therefrom a recycle gas rich in hydrogen, flash vaporizing the remaining second absorbent in a low pressure zone to remove additional hydrogen and light hydrocarbons, stripping the resultant absorbent with said recycle gas and returning the stripped absorbent and the recycle gas to the secondary absorber, withdrawing rich first absorbent from the primary absorber, stripping said absorbent and returning the same to the primary absorber.

4. A method for concentrating hydrogen which comprises contacting a gaseous charge containing hydrogen and low molecular weight hydrocarbons with a first liquid hydrocarbon absorbent under a pressure of from about 1000 to about 5000 pounds per square inch in a primary absorber, passing gas from the primary absorber into a secondary absorber at an intermediate point thereof, introducing recycle gas, prepared as hereinafter described, near the bottom thereof and a second liquid hydrocarbon absorbent near the top thereof, removing overhead from said secondary absorber a gas richer in hydrogen than said gaseous charge, flash vaporizing the rich second absorbent in a high pressure zone to separate therefrom a recycle gas rich in hydrogen, flash vaporizing the remaining second absorbent in a low pressure zone to remove additional hydrogen and light hydrocarbons, stripping the resultant absorbent with said recycle gas in a secondary stripper and returning the stripped absorbent and the recycle gas to said secondary absorber, withdrawing rich first absorbent from the primary absorber, stripping said rich first absorbent with gas from said low pressure zone in a primary stripper, and returning the stripped absorbent to the primary absorber.

5. The process of claim 4 further characterized in that the ratio of the rate of circulation of the second liquid hydrocarbon absorbent to the rate of circulation of the first liquid hydrocarbon absorbent is substantially greater than about 10.

6. A method for concentrating hydrogen which comprises contacting a gaseous charge containing hydrogen and low molecular weight hydrocarbons with a first liquid hydrocarbon absorbent under a pressure of from about 1000 to about 5000 pounds per square inch in a primary absorber, passing gas from the primary absorber into a secondary absorber at an intermediate point thereof, introducing recycle gas, prepared as hereinafter described, near the bottom thereof, and a second liquid hydrocarbon absorbent near the top thereof, removing overhead from said secondary absorber a gas richer in hydrogen than said gaseous charge, flash vaporizing the rich second absorbent in two stages in high pressure zone to separate therefrom two streams of gas rich in hydrogen, flash vaporizing the remaining second absorbent in a low pressure zone to remove additional hydrogen and light hydrocarbons, stripping the resultant absorbent with said two gaseous streams from the high pressure zone in a secondary stripper and returning the stripped absorbent and the effluent gas to said secondary absorber, withdrawing rich first absorbent from the primary absorber, stripping said absorbent with the gas from said low pressure zone in a primary stripper, and returning the same to the primary absorber.

7. The process of claim 6 further characterized in that the temperature of the absorbents and gaseous streams are approximately 100° F., and the pressures in the primary absorber, secondary absorber, first stage of the high pressure flash vaporizing zone, second stage of the high pressure flash vaporizing zone, low pressure flash vaporizing zone, secondary stripper, and primary stripper are in the approximate ratios of 2000:2000:1200:500:20:20:20 pounds per square inch, respectively.

8. The process of claim 6 further characterized in that the temperature of the absorbents and gaseous streams are approximately 100° F., the pressures in the primary absorber, secondary absorber, first stage of the high pressure flash vaporizing zone, second stage of the high pressure flash vaporizing zone, low pressure flash vaporizing zone, secondary stripper, and primary stripper are in the approximate ratios of 2000:2000:1200:500:20:20:20 pounds per square inch, respectively, and the ratio of the rate of circulation of the second liquid hydrocarbon absorbent to the rate of circulation of the first liquid hydrocarbon absorbent is about 25.

9. A method for concentrating hydrogen which comprises contacting a gaseous charge containing hydrogen and low molecular weight hydrocarbons with a liquid absorbent under superatmospheric pressure in an absorber, recovering a hydrogen-rich gas from the absorber, removing enriched absorbent from the absorber and flash vaporizing absorbed gases therefrom in a high pressure zone and then in a low pressure zone, thereafter stripping the absorbent with gases from said high pressure zone, returning effluent gas from the stripping step to the lower portion of said absorber and returning the stripped absorbent to the upper portion of the absorber.

10. A method for concentrating hydrogen which comprises contacting a gaseous charge containing hydrogen and low molecular weight hydrocarbons with a first liquid hydrocarbon absorbent under superatmospheric pressure in a primary absorber, passing gas from the primary absorber into a secondary absorber and therein contacting the same with a second liquid hydrocarbon absorbent, withdrawing a hydrogen-rich gas from said secondary absorber, flash vaporizing absorbed gases from the enriched second absorbent in a high pressure zone and then in a low pressure zone, thereafter stripping the second absorbent with gases from said high pressure zone, returning effluent gas and the second absorbent from the stripping step to the lower and upper portions, respectively, of said secondary absorber, stripping the enriched first absorbent from the primary absorber with gases from said low pressure zone, and returning the stripped first absorbent to said primary absorber.

References Cited in the file of this patent

UNITED STATES PATENTS

| Number | Name | Date |
| --- | --- | --- |
| 1,869,825 | Ritter et al. | Aug. 2, 1932 |
| 2,074,644 | Drennan | Mar. 23, 1937 |
| 2,299,830 | Legatski et al. | Oct. 27, 1942 |
| 2,337,254 | Legatski et al. | Dec. 21, 1943 |
| 2,428,521 | Latchum, Jr. | Oct. 7, 1947 |
| 2,468,750 | Gudenrath | May 3, 1949 |
| 2,495,842 | Gilliland | Jan. 31, 1950 |
| 2,523,747 | Weatherby | Sept. 26, 1950 |